(12) United States Patent
Campetella et al.

(10) Patent No.: US 8,601,937 B2
(45) Date of Patent: Dec. 10, 2013

(54) APPARATUS FOR MAKING COFFEE

(76) Inventors: Carl James Campetella, Staten Island, NY (US); Gil Garcia, Staten Island, NY (US)

( * ) Notice: Subject to any disclaimer, the term of this patent is extended or adjusted under 35 U.S.C. 154(b) by 1178 days.

(21) Appl. No.: 11/499,837

(22) Filed: Aug. 4, 2006

(65) Prior Publication Data

US 2007/0193452 A1 Aug. 23, 2007

Related U.S. Application Data

(63) Continuation-in-part of application No. 11/362,597, filed on Feb. 23, 2006.

(51) Int. Cl.
*A47J 31/24* (2006.01)
*A47J 31/42* (2006.01)

(52) U.S. Cl.
USPC .............................. 99/286; 99/289 R; 99/302 P

(58) Field of Classification Search
USPC .................. 99/286, 289 R, 302 P, 302 R, 300
See application file for complete search history.

(56) References Cited

U.S. PATENT DOCUMENTS

| | | | | |
|---|---|---|---|---|
| 3,793,933 A | * | 2/1974 | Weber | 99/283 |
| 4,858,522 A | * | 8/1989 | Castelli | 99/280 |
| 5,103,716 A | * | 4/1992 | Mikkelsen | 99/289 R |
| 5,259,296 A | * | 11/1993 | Mikael et al. | 99/280 |
| 5,463,934 A | * | 11/1995 | Locati | 99/286 |
| 5,490,447 A | * | 2/1996 | Giuliano | 99/286 |
| 5,605,091 A | * | 2/1997 | Garber | 99/330 |
| 5,650,186 A | * | 7/1997 | Annoni et al. | 426/231 |
| 7,024,985 B2 | * | 4/2006 | Park | 99/302 P |
| 7,322,275 B2 | * | 1/2008 | Lussi | 99/281 |
| 7,322,276 B2 | * | 1/2008 | Nicolini | 99/289 R |
| 7,328,649 B2 | * | 2/2008 | Morin et al. | 99/286 |
| 2010/0024657 A9 | * | 2/2010 | Nosler et al. | 99/289 R |

OTHER PUBLICATIONS

Astra Manufacturing, "Discover . . . Super Mega One," owner's manual comprising pp. 1-23 (undated).
"Programming the Super Mega and Astra 2000," programming guide attached to owner's manual, pp. 1-5.
Judith L. Toffenetti, letter to Ognjan V. Shentov Re: Prior Art to Invention Disclosed and Claimed in U.S. Appl. Nos. 11/499,837 and 11/0196551 (sic), dated Oct. 21, 2008.
Specialty Coffee Retailer, Jul. 2001, p. 34.
Specialty Coffee Retailer, Jan. 2002, p. 34.
Specialty Coffee Retailer, Jan. 2003, p. 68.
Specialty Coffee Retailer, Mar. 2004, p. 40.
Specialty Coffee Retailer, Feb. 2005, p. 12.
Specialty Coffee Retailer, Mar. 2006, p. 24.
Specialty Coffee Retailer, Sep. 2008, p. 38.
"Astra Automatic Espresso & Cappuccino Machines," catalog (copyright 2008).

(Continued)

*Primary Examiner* — Reginald L Alexander
(74) *Attorney, Agent, or Firm* — Megan Lyman

(57) ABSTRACT

Apparatus for brewing coffee comprising a brewing chamber for receiving programmable quantities of ground coffee and combining the ground coffee with quantities of hot, pressurized water, a piston for compressing the ground coffee in the brewing chamber, and an o-ring fitted to the outside of the piston so as to maintain a pressure-tight seal against the wall of the brewing chamber.

4 Claims, 3 Drawing Sheets

(56) References Cited

OTHER PUBLICATIONS

Marybeth Peters, Register of Copyrights, United States of America, Certificate of Registration, Registration Number: TX 6-863-365, effective date of registration: Sep. 12, 2008; Year of Completion: 1999; Date of 1st Publication: Jan. 1, 1999.
Astra, "Super Mega 1," brochure (undated).
Astra, "Operation Manual for Astra Super Automatic Machines," undated.
Astra, "Super Mega 1 Parts Manual," 1997.
Intertek Testing Services, "Factory Audit Manual and Procedural Guide for Complying With ETL Listing, In-Plant Labeling, and Follow-Up Service Requirements," Feb. 2, 1998.
Astra, Purchase Order for Super Mega 1, Feb. 8, 1995.
Astra, Purchase Order for Astra 2000, 22 gram brew chamber, extended program for grinding & extraction, Jan. 4, 2005.
Astra Manufacturing, Complaint for Damages and Injunctive Relief, Sep. 18, 2008.

* cited by examiner

APPARATUS FOR MAKING COFFEE

CROSS-REFERENCE TO RELATED APPLICATIONS

This application claims the priority of U.S. application Ser. No. 11/362,597, filed on Feb. 23, 2006, of which it is a continuation-in-part. The prior application is incorporated herein in its entirety by reference.

FIELD OF THE INVENTION

This invention relates generally to apparatus for making beverages. More particularly, the invention is directed to an apparatus for brewing coffee.

BACKGROUND

Coffee has been consumed as a beverage for centuries. Over time, a wide variety of coffee-making methods and devices have been developed, e.g. percolators, vacuum pots, the "French press," drip coffee makers, and others.

During the first half of the 20th century, the espresso machine was developed in Italy. The principle of the espresso machine was to bring hot (but not boiling) water, under pressure, in contact with a quantity of finely ground, compressed coffee beans for a relatively short period of time, thereby producing one or two very small cups of highly flavored coffee.

The flavorful nature of espresso is mainly due to the layer of golden-colored.crema floating at the top of the cup. The crema comprises emulsified oils and other substances extracted from the ground coffee beans by the pressurized water. Besides playing a key role in transmitting flavor, the crema layer has a visual appeal similar to that of a head on a glass of beer.

Other aspects of the espresso-making process that enhance the flavor are: 1) The hot water is in contact with the ground coffee for a relatively short time, long enough to extract flavor components but not so long as to damage them; and 2) Espresso is made as a single serving (or sometimes two servings), intended for immediate consumption, which prevents flavor components from degrading or evaporating.

These aspects of espresso-making are to be contrasted with other methods that involve the brewing of multi-cup quantities of coffee, which is then kept hot until consumed. Such methods typically require a longer period of contact between the ground coffee and the hot water, which can damage flavor components, and then some period of time between brewing and consumption, which can allow flavor components to degrade or escape through evaporation.

While existing methods of brewing coffee using espresso machines produce very flavorful coffee with an attractive crema layer, the coffee produced by such machines and processes is very thick and concentrated. Espresso as it emerges from the machine has been described as having the consistency of warm honey. The flavor is also very robust or strong. The quantity of coffee per cup is very small, on the order of one ounce. Because the quantity is small and the flavor volatile, it is usually consumed quickly, often while standing at a bar. This style of coffee is very much in favor in continental Europe, e.g. in France, Italy, and Spain, but is very different from the style of coffee chiefly favored in the United States.

While espresso consumption has increased markedly in the United States in recent decades, most coffee consumed in the United States is of a very different style, being less concentrated, less thick (less viscous), and less strongly flavored. Individual servings are also much larger, ranging from perhaps 6 to 20 ounces. Because this coffee is less concentrated and served in much larger quantity, different social rituals are associated with its consumption, compared to the quick consumption of espresso at a European espresso bar. In America, the large cups of low-concentration coffee are sipped over a relatively long period of time, for example as an accompaniment to a meal, or at a desk while working, or in a car while commuting.

In Europe, this style of coffee is called American Coffee and it is sometimes simulated by mixing together espresso and hot water. This, however, defeats the flavor preserving advantages of the normal espresso method and destroys the crema layer.

At the same time, American tastes have become much more sophisticated, and many Americans, while continuing to prefer a large cup of coffee that can be sipped over time, would enjoy the visual appeal and flavor enhancement of a crema layer on the coffee.

What is needed is a method and apparatus for producing large servings of relatively low-concentration coffee (i.e. American coffee) with some of the desirable characteristics of espresso, such as enhanced flavor and crema.

SUMMARY

Methods and apparatus for making coffee, and coffee produced thereby, are disclosed. In one aspect, a method for brewing coffee comprises the steps of transferring ground coffee to a brewing chamber, compressing the ground coffee, and forcing pressurized hot water through the ground coffee, thereby causing brewed coffee to emerge through a microfilter, wherein the ratio of weight of ground coffee contained in the brewing chamber to volume of pressurized hot water forced through the ground coffee is 6 grams per fluid ounce or less.

A coffee beverage produced by this method is also disclosed, preferably with a single serving of about 12 to 20 fluid ounces. Preferably, the coffee has a layer of crema, which may be about ¼" deep and may last for at least 10 minutes.

In one aspect of the disclosure, the ground coffee is ground more coarsely than espresso coffee. The coffee may be ground with burrs set between ¼" and ⅜" apart. The coffee may be ground using a slicing method. The amount of ground coffee transferred to the brewing chamber may be between about 13 grams and about 22 grams. The amount of pressurized hot water forced through the ground coffee may be between about 10 fluid ounces and 20 fluid ounces. In one specific embodiment, the brewing chamber can hold at least 22 grams of ground coffee at one time. The coffee may be compressed with more than 30 pounds of force distributed across the upper surface of the ground coffee. In a specific embodiment, the coffee may be compressed with about 40 pounds of force distributed across the upper surface of the coffee. In a specific embodiment, the coffee is compressed by a piston mechanism. In one aspect, the temperature of the water is more than 198 degrees Fahrenheit. The temperature of the water may be about 204 degrees Fahrenheit. The pressure of the water may be between 127 and 141 pounds per square inch. In one aspect, the step of forcing water through the coffee has a duration of more than 20 seconds. In a specific embodiment, the microfilter is made of a material having a low heat conductivity. The material of which the microfilter is made may be Teflon. The material of which the microfilter is made may be PVC plastic.

In one embodiment, a programmable apparatus for making coffee comprises a hopper for holding coffee beans, a grinding element for receiving the coffee beans and grinding them to produce ground coffee, a brewing chamber for receiving programmable quantities of ground coffee and combining the ground coffee with quantities of hot, pressurized water, a piston for compressing the ground coffee, the piston being arranged to enter the brewing chamber at an open end thereof, and an o-ring fitted to the outside of the piston so as to maintain a pressure-tight seal against the wall of the brewing chamber, and a programming element for selectively determining a quantity C of ground coffee to be combined with a quantity W of water in the brewing chamber, the brewing chamber being capable of accommodating more than 14 grams of ground coffee. In one embodiment, C is 14 grams or less and W is at least 8 fluid ounces. In another embodiment, C is more than 14 grams, and W is at least 16 fluid ounces.

The pressure of the pressurized water may be 100 pounds per square inch or less. The pressure of the pressurized water may be about 85 pounds per square inch. The dimensions of the brewing chamber may be selected so that it can accommodate up to about 24 grams of ground coffee. The brewing chamber may be cylindrical and may have an inside diameter of at least 2 inches. The grinding element may comprise burrs set between ¼" and ⅜" apart. The grinding element may grind the coffee more coarsely than ground espresso coffee. In one embodiment, the values of C and W are selected such that C divided by W is 6 grams per fluid ounce or less. The piston may further comprise, at its bottom surface, a quantity of infusion holes, the diameter of the holes being about 2 mm. The piston may further comprise a layer of Teflon tape interposed between the o-ring and the outside surface of the piston.

In another embodiment, an apparatus for brewing coffee comprises a brewing chamber having a microfilter, means for compressing ground coffee in the brewing chamber, and means for forcing hot water through the ground coffee in the brewing chamber, thereby causing brewed coffee to emerge through the microfilter; wherein the ratio of weight of ground coffee contained in the brewing chamber to volume of pressurized hot water forced through the ground coffee is 6 grams per fluid ounce or less.

The apparatus may further comprise means for storing coffee beans, and means for grinding coffee beans to produce ground coffee. The grinding means may comprise burrs set between ¼" and ⅜" apart. The grinding means may employ a slicing method of grinding. The grinding means may produce ground coffee more coarsely ground than ground espresso. The brewing chamber may be able to hold at least 14 grams of ground coffee. The amount of pressurized hot water forced through the ground coffee may be greater than 8 fluid ounces. The brewing chamber may be able to hold at least 22 grams of ground coffee at one time. The means for compressing may provide more than 30 pounds of force distributed across the upper surface of the coffee. The apparatus may further comprise means for heating the water to more than 198 degrees Fahrenheit. The apparatus may further comprise means for heating the water to about 204 degrees Fahrenheit. The apparatus may further comprise means for creating and sustaining a water pressure of between 127 and 141 pounds per square inch, or of 100 pounds per square inch or less, or of about 85 pounds per square inch.

DETAILED DESCRIPTION

The invention described in detail herein generally relates to an apparatus and method for making coffee.

Figure 1:
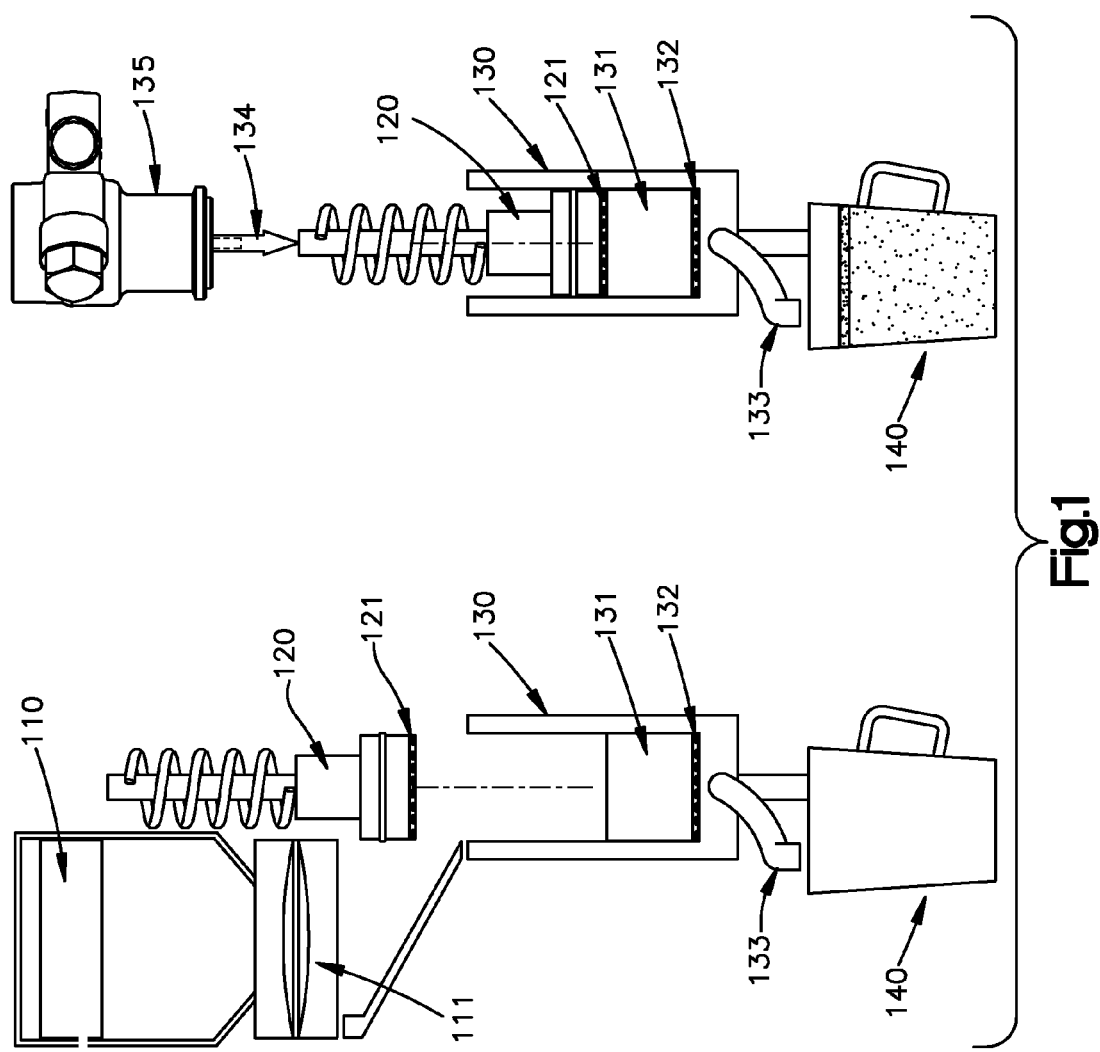
FIG. 1 depicts exemplary apparatus for making coffee.

FIG. 1 depicts an example apparatus that can be used in making coffee. The apparatus is intended as an example only, and other devices capable of performing the method steps discussed below can be used instead.

Hopper 110 holds whole coffee beans. Grinding element 111 receives whole beans from hopper 110 and grinds or mills them to produce ground coffee 131 (also sometimes referred to as coffee grinds or coffee grounds). In one embodiment, grinding element 111 is of the European burr type, with adjustable burrs, although other types of coffee grinders or mills can be used. In a preferred embodiment, the burrs of grinding element 111 are arranged to grind the coffee with a slicing action. Adjustable burrs should preferably be set between ¼" and ⅜" apart. Ground coffee 131 produced by the slicing action of grinding element 111 differs from ground espresso coffee in consistency and fineness. In particular, it is substantially less fine than ground espresso coffee. It will be understood that, while part of the preferred embodiment, the hopper 110 and grinding element 111 may be implemented as separate devices in alternative embodiments.

Ground coffee 131 is transferred to brewing chamber 130. Brewing chamber 130 must be large enough to accommodate quantities of ground coffee 131 and hot water sufficient to produce a large cup of coffee. Preferably, brewing chamber 130 is sized to accommodate 13 to 22 grams of ground coffee 131.

Piston 120 compresses ground coffee 131, preferably with more than 30 pounds of force distributed across the upper surface of the coffee, and most preferably with about 40 pounds of force. Piston 120 can be driven by a spring, as shown, or by some other mechanism capable of imparting the required force. In another variation, ground coffee 131 can be compressed manually. Compressing ground coffee 131 is necessary in order to sustain uniform high-pressure contact between the grounds of ground coffee 131 and hot water. The about 40 pounds of force is higher than the force used in compressing espresso coffee, which is normally about 30 pounds. The higher force is preferable because of the consistency and fineness of ground coffee 131 which, as noted above, differs from the consistency and fineness of ground espresso coffee. If compression force is applied manually, preferably the force is between about 35 and 45 pounds.

Pressurized hot water 134 is forced through piston 120, then through first microfilter 121, and then through ground coffee 131. In one embodiment, the bottom of piston 120 comprises infusion holes that admit water through microfilter 121 into the brewing chamber. Microfilter 121 acts as a shower screen to spread water evenly over the grounds and also prevents grounds from escaping out the top of the brewing chamber. In one embodiment, the infusion holes are enlarged to allow more water through the grinds in order to make a larger cup of coffee. Preferably, the size of the infusion holes is about 2 mm. In a preferred embodiment, there are 5 infusion holes. First microfilter 121 can be made of a metal (e.g. stainless steel), or of a low heat-conductivity material, such as Teflon or PVC plastic. The temperature of the water should be below the boiling point (i.e., below 212 degrees Fahrenheit). On the other hand, the temperature of the water should be high enough, so that the product produced by the apparatus is a hot cup of coffee that will remain pleasantly hot when consumed over a relatively long period of time, as opposed to the quick consumption of a cup of espresso. Therefore, while the temperature of the water used in espresso-making is typically in the range of from 190 to 203 degrees Fahrenheit (see, e.g., coffeeresearch.org/espresso/definitions.htm, visited February, 2006), the temperature of pressurized hot water 134 is at the high end of this range or higher. Preferably, the temperature of pressurized hot water 134 is about 204 degrees Fahrenheit. However, other temperatures may be used. The water may be heated by an immersion heater, heatexchanger, or other suitable heat source. Preferably, the pressure of pressurized hot water 134 is between about 127 to 141 pounds per square inch. However, other pressures may be used. For example, see discussion below, other pressures may be possible or desirable with different-sized brewing chambers and pistons. The water pressure may be created and sustained by an electric pump or other suitable mechanism.

Brewed coffee emerges from second microfilter 132 and passes through coffee spout 133 and into cup 140. Second microfilter 132 can be made of metal (e.g. stainless steel), or of a low heat-conductivity material, such as Teflon or PVC plastic. In one embodiment, cup 140 has a capacity or serving size of 12 to 20 ounces. However, other capacities or serving sizes, such as 5 ounces, 6 ounces, or 24 ounces, or other sizes, may be provided. The coffee in cup 140 produced in the above way typically has a crema layer 141. Preferably, crema layer 141 is about ¼" deep, but a different depth can be achieved with different coffee blends. Preferably, the crema layer lasts for at least 10 minutes, which time may vary in different cases. The depth and duration of the crema is determined by multiple factors, including the water pressure, water temperature and type of filter employed, as described herein.

Figure 2:
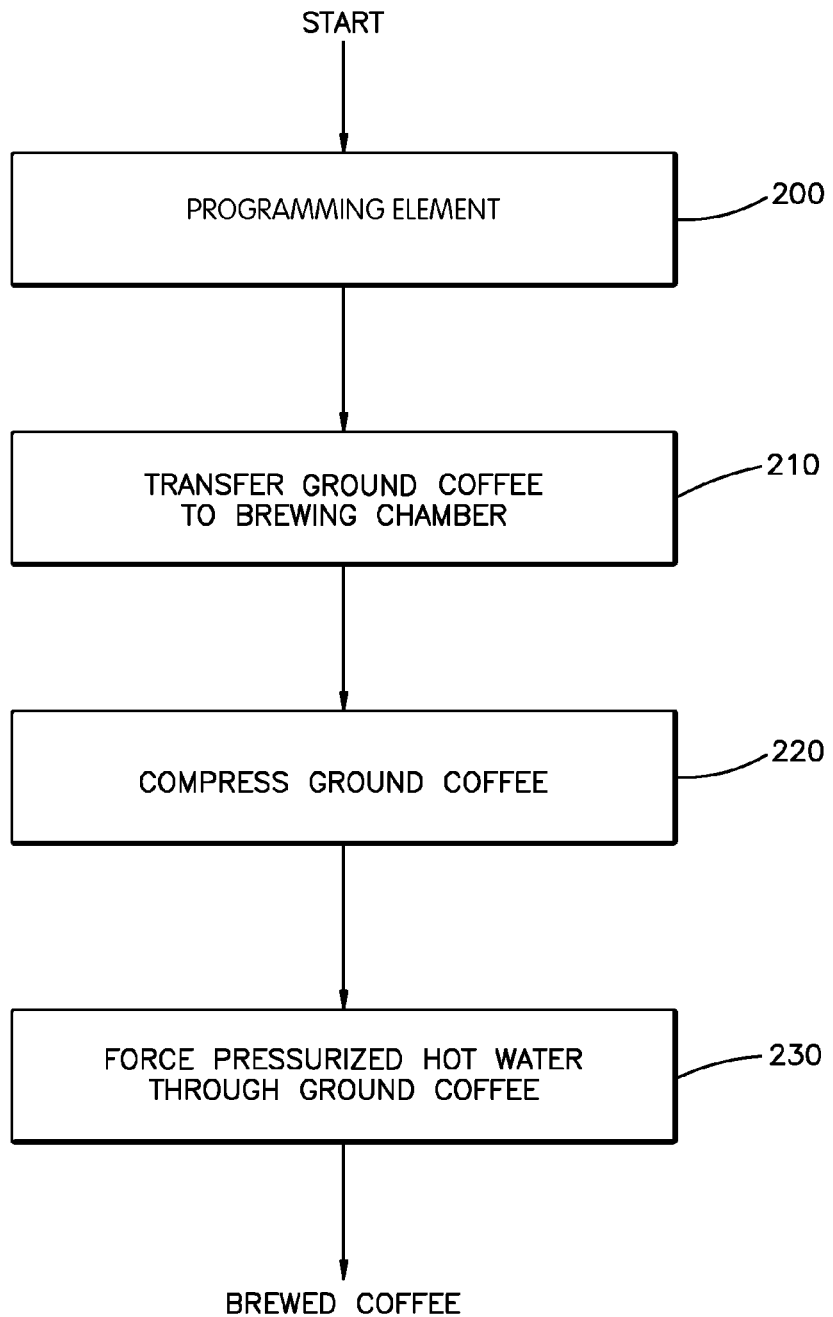
FIG. 2 is a flow chart of an exemplary process for making coffee.

In some embodiments, the coffee-making apparatus is programmable, meaning that one or more of the brewing parameters discussed above can be adjusted or selected by programming a controlling element, or programming element 200 of the apparatus, e.g. a microprocessor (See FIG. 2). For example, the amount of ground coffee transferred to the brewing chamber and the amount of hot water forced through the ground coffee may be programmable. Other brewing parameters that may be programmable in various embodiments include: infusion time; spacing of the grinder burrs; coarseness or fineness of the grind produced by the grinding element; pounds of force used to compress the ground coffee; temperature of the water; volume of water; and water pressure. In some embodiments, one or more of these parameters may be adjustable by some mechanism other than microprocessor control, e.g. by turning a knob or an adjusting screw. The programming element 200 is depicted in FIG. 2.

Another parameter that may be programmable or adjustable in various embodiments is the number N of brewing cycles. A brewing cycle comprises transferring a quantity of C grams of ground coffee to the brewing chamber, compressing the ground coffee, passing W fluid ounces of pressurized hot water through the ground coffee so as to produce a quantity of coffee beverage, and expelling the used coffee grounds from the brewing chamber. The total volume of coffee beverage produced is about N times W. A larger quantity of coffee can be brewed by selecting larger values of N. The maximum value of C, the amount of ground coffee per brewing cycle, is limited by the size of the brewing chamber. In conventional programmable espresso machines, the brewing chamber can hold no more than about 14 grams of ground coffee, which is the amount needed for a double espresso.

In one embodiment, the problem of producing relatively large servings of relatively low-concentration coffee with some of the desirable characteristics of espresso is solved by programming a programmable espresso machine to perform a sufficient number of brewing cycles to produce the quantity desired, while programming the amounts of ground coffee and pressurized hot water used per brewing cycle to adjust the concentration to the desired level. For example, if N is set to 2, C is set to 10, and W is set to 8, a serving of about N×2=16 fluid ounces of coffee beverage with a concentration of 10/8=1.25 grams of coffee per fluid ounce of water can be produced. In this embodiment, the conventional espresso brewing chamber holding not more than about 14 grams of ground coffee can be used.

In a variation, the parameter N is not electronically programmable, but an equivalent result is obtained by manually cycling the apparatus N times.

The embodiment just described can be characterized as a "software" solution in that it can be implemented by changing the programming of a programmable espresso machine. However, in some applications, for example commercial applications where the time to produce a single cup of coffee is an important factor, it may be desirable to produce a large cup of coffee in a single cycle. This can be accomplished by enlarging the brewing chamber beyond the dimensions of the conventional espresso brewing chamber.

Figure 3:
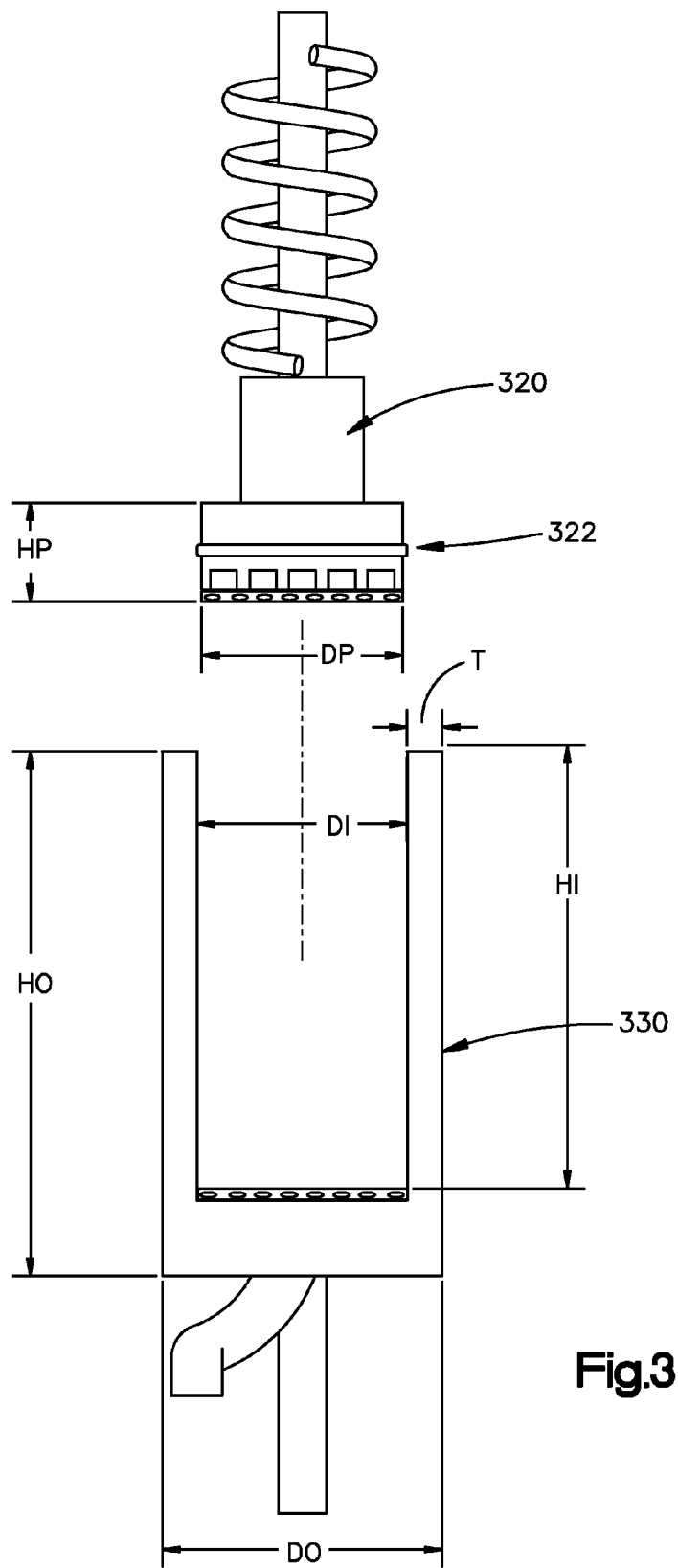
FIG. 3 depicts a brewing chamber and piston.

FIG. 3 shows an enlarged brewing chamber 330. In a preferred embodiment, an enlarged brewing chamber can hold up to about 24 grams of ground coffee. In a preferred embodiment, the dimensions of the brewing chamber are: inside diameter DI 2⅛"; inside height HI 1½"; outside diameter DO 2⁷⁄₁₆".

Also shown in FIG. 3 is an enlarged piston 320 sized to fit within brewing chamber 330 such that o-ring 322 makes a water-tight seal with the inside surface of brewing chamber 330.

One consequence of enlarging piston 320 follows from the well-known relation between force F on a piston, the pressure P of liquid within the piston, and the area A of the piston head, which is F=PA. That is, if the pressure P of pressurized water in the brewing chamber is kept constant, the increased area A of the enlarged piston will cause an increased force F to be exerted on the piston, compared to the equivalent force experienced in the conventional espresso brewing chamber. The inventors have found that this increased upward force on the piston has the effect of tending to break the seal of the o-ring against the chamber wall, thus permitting an undesirable leakage of water from the chamber.

In one embodiment, this effect is mitigated by improving the seal of the o-ring, for example by interposing a layer of Teflon tape between the o-ring and the outside surface of the piston.

In another embodiment, this effect is mitigated by reducing the water pressure. Whereas conventional espresso makers employ pressures in the neighborhood of 130 psi (see, e.g. "espresso" at wikipedia.com), the inventors have found that flavorful coffee can be brewed in this apparatus at pressures of less than 100 psi, and even as low as 32 psi. In a preferred embodiment, the pressure is 85 psi. At least in part, this is believed to be due to the fact that the larger infusion surface 320 of the enlarged piston compensates for the reduced pressure.

In one embodiment, a programmable coffee-making apparatus is arranged to produce a single serving of at least 16 fluid ounces of coffee in a single brewing cycle (N=1) using an amount of ground coffee C of more than 14 grams and an amount of hot pressurized water W of at least 16 fluid ounces and a brewing chamber with dimensions selected to accommodate more than 14 grams of ground coffee.

FIG. 2 is a flowchart describing the steps of an exemplary method for making coffee.

Not illustrated, the first step is to grind the coffee, as described above.

Step 200 shows the programming element described above. At step 210, ground coffee is transferred to a brewing chamber.

At step 220, the ground coffee is compressed.

At step 230, pressurized hot water is forced through the ground coffee, wherein the ratio of weight of ground coffee to volume of pressurized hot water is 6 grams per fluid ounce or less, resulting in the production of brewed coffee.

Further details on the steps of the exemplary method are provided as follows.

The amount of ground coffee transferred to the brewing chamber at step 210 must be sufficient to prepare a relatively large cup of brewed coffee, preferably between about 13 grams and about 22 grams of ground coffee. However, smaller or larger amounts of ground coffee may be used.

The ground coffee transferred to the brewing chamber at step 210 preferably is ground more coarsely than espresso coffee. Preferably, the coffee is ground in a grinder or mill of the European burr type, with adjustable burrs, although other types of coffee grinders or mills may be used. The burrs preferably are arranged to grind the coffee using a slicing action. Adjustable burrs should preferably be set between ¼" and ⅜" apart, although other spacings may be used.

The force applied to compress the coffee at step 220, in one embodiment, is about 40 pounds, distributed across the surface of the ground coffee being compressed. However, other amounts of force, either less than 40 pounds or more than 40 pounds, may be used. In one variation, more than 30 pounds of force is used, 30 pounds being the typical compression force used in preparing espresso coffee. The coffee may be compressed using a piston mechanism driven, for example, by a spring or a motor, or some other mechanism capable of supplying the required force. The coffee may also be compressed by hand using, e.g., a hand-held tamper. If compressed by hand, preferably about 35 to 45 pounds of force is applied.

The hot pressurized water forced through the grounds at step 230 should have a temperature below the boiling point (i.e., below 212 degrees Fahrenheit). On the other hand, the temperature of the water should be high enough so that the product produced by the apparatus is a hot cup of coffee that will remain pleasantly hot when consumed over a relatively long period of time, as opposed to the quick consumption of a cup of espresso. Therefore, while the temperature of the water used in espresso-making is typically in the range of from 190 to 203 degrees Fahrenheit (see, e.g., coffeeresearch.org), the temperature of pressurized hot water forced through the grounds at step 230 is at the high end of this range or higher. Preferably, the temperature of pressurized hot water is 204 degrees Fahrenheit. However, other temperatures may be used. The water may be heated by an immersion heater, heat exchanger, or other suitable heat source. Preferably, the pressure of pressurized hot water is between about 127 to 141 pounds per square inch. However, other pressures may be used. For example, the pressure may vary depending on the dimensions of the brewing chamber. The water pressure may be created and sustained by an electric pump or other suitable mechanism. Preferably, the duration of the step of forcing hot pressurized water through the grounds is more than 20 seconds, in order to produce a relatively large (12-20 fluid ounce) serving of the desired concentration. However, other durations may be used, depending in particular on the desired serving size.

As noted above, amounts of ground coffee in the range of about 13 to 22 grams are transferred to the brewing chamber. However, smaller amounts (e.g. 10 grams) or larger amounts (e.g. 26 grams) of coffee may be used. Amounts of pressurized hot water applied at step 230 should be sufficient to produce the required relatively large servings, e.g. 12 to 20 fluid ounces in one embodiment. (The volume of pressurized hot water applied in the brewing process is at least equal to the volume of the intended serving of brewed coffee, and but typically somewhat greater, since some pressurized hot water will be absorbed by the grounds and remain behind in the brewing chamber.) The amount of pressurized hot water is, thus, significantly more than the amount required to produce a 1-2 ounce serving of espresso.

Also, the ratio of the weight of ground coffee in the brewing chamber to the volume of pressurized hot water forced through it at step 230 differs significantly from the corresponding parameter in the brewing of traditional espresso. In the brewing of espresso, this ratio may typically be in the range of 6.5 to 7 grams of ground coffee per fluid ounce of hot pressurized water. That is, in the brewing of a one-ounce shot of espresso, 6.5 or more grams of ground coffee may be used. In the exemplary method of FIG. 2, by contrast, the ratio may be, for example, 13 grams of ground coffee to about 12 fluid ounces of hot pressurized water, or 22 grams of ground coffee to about 20 fluid ounces of hot pressurized water, or a ratio of about 1.1 to one. Other variations with ratios either higher or lower than 1.1 are possible, while still remaining less than the 6.5 to 7 grams of ground coffee per fluid ounce of hot pressurized water typical of espresso-brewing. For example, in one variation, the ratio is 6 grams per fluid ounce or less. In a preferred embodiment, 13.5 grams of coffee and 10 fluid ounces of water are used, or a ratio of 1.35.

The coffee produced by the described method may comprise a single serving of about 12 to 20 fluid ounces. It will be appreciated, of course, that other serving sizes, such as 5 ounces, 6 ounces, or 24 ounces, or other sizes, either greater than 20 or less than 12 ounces, may be produced. The coffee produced by the method may have a crema layer. Preferably, the crema layer is about y." deep. However, it may have a different depth. Preferably, the crema layer lasts for at least 10 minutes. However, the crema layer may last for a shorter or longer time.

The description contained herein is for purposes of illustration and not for purposes of limitation. Changes and modifications may be made to the embodiments of the description and still be within the scope of the invention. Furthermore, obvious changes, modifications or variations will occur to those skilled in the art. Also, all references cited above are incorporated herein by reference, in their entirety, for background and to assist the reader of this disclosure.

While the invention has been shown and described herein with reference to particular embodiments, it is to be understood that the various additions, substitutions, or modifications of form, structure, arrangement, proportions, materials, and components and otherwise, used in the practice and which are particularly adapted to specific environments and operative requirements, may be made to the described embodiments without departing from the spirit and scope of the present invention. Accordingly, it should be understood that the embodiments disclosed herein are merely illustrative of the principles of the invention. Various other modifications may be made by those skilled in the art which will embody the principles of the invention and fall within the spirit and the scope thereof.

We claim:

1. A programmable apparatus for making a serving of crema coffee comprising:
- a hopper for holding approximately 13 to 25 grams of coffee beans;
- a grinding chamber larger than traditional espresso brewers, having a grinding element for receiving the coffee beans and having a plurality of burrs adjusted so that they grind with a slicing action, producing a ground coffee with a grind size greater than approximately 0.010 inches;
- a brewing chamber larger than a brewing chamber used for brewing espresso coffee and holds approximately 13 to 25 grams of coffee for receiving programmable quantities of ground coffee and combining the ground coffee with specific quantities of hot, pressurized water;
- a piston, of a larger diameter than traditional espresso brewers, for compressing the ground coffee at a force between approximately 35 and 45 pounds, the piston being arranged to enter the brewing chamber at an open end thereof wherein pressurized hot water is forced through the piston and through a first microfilter for more than 20 seconds, and the pressure of the hot water is between approximately 127 to 141 pounds per square inch;—and
- a programming element for selectively determining a quantity C of approximately 13 to 25 grams of ground coffee to be combined with a quantity W of at least 8 fluid ounces of water in the brewing chamber such that the ratio of C to W is less than 6 grams per fluid ounce, and the surface area of the ground coffee exposed to the hot water is approximately 2 and $\frac{1}{8}$th inches, the brewed coffee passing through a second microfilter and producing crema coffee.

2. The apparatus of claim 1 wherein the brewing chamber is cylindrical and has an inside diameter of at least 2 inches.

3. The apparatus of claim 1 wherein the grinding element comprises burrs set between $\frac{1}{4}$" and $\frac{3}{8}$" apart.

4. The apparatus of claim 1 wherein the piston further comprises, at its bottom surface, a quantity of infusion holes greater than holes present in an espresso making apparatus, the diameter of the holes being about 2 mm.

* * * * *